3 Sheets—Sheet 3
C. G. SARGENT.
MACHINERY FOR WASHING AND DYEING FIBROUS MATERIAL.
No. 103,506. Patented May 24, 1870.
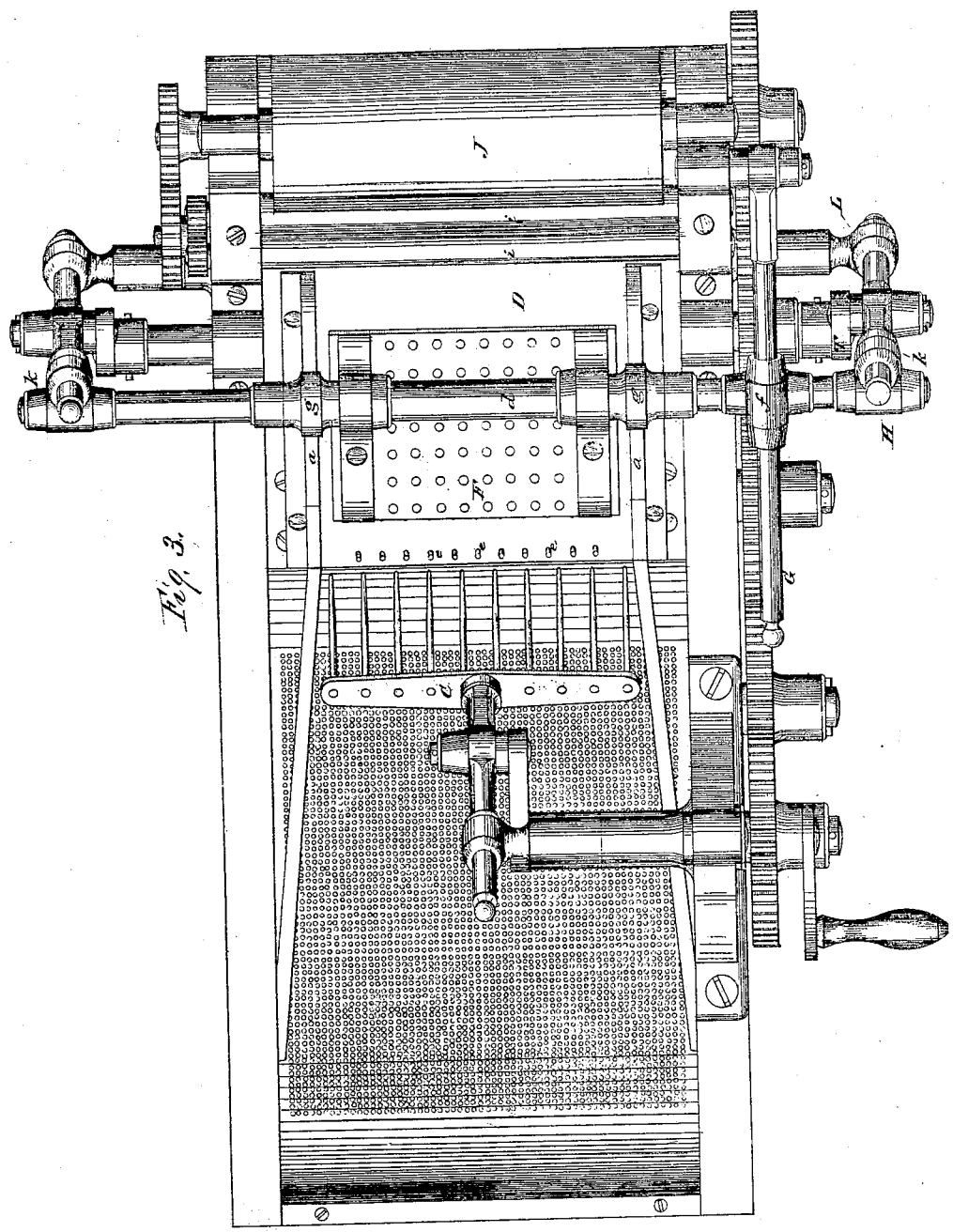

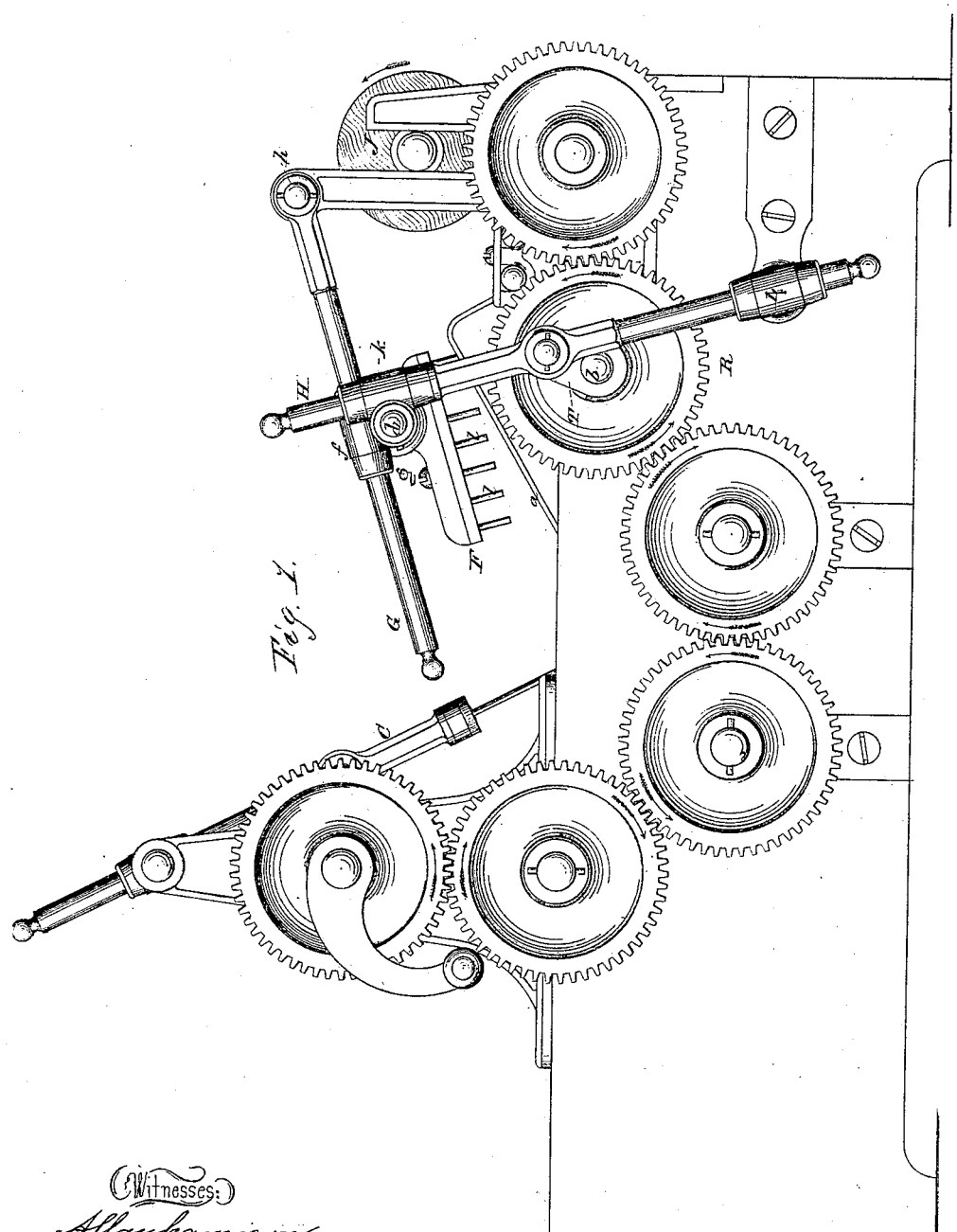

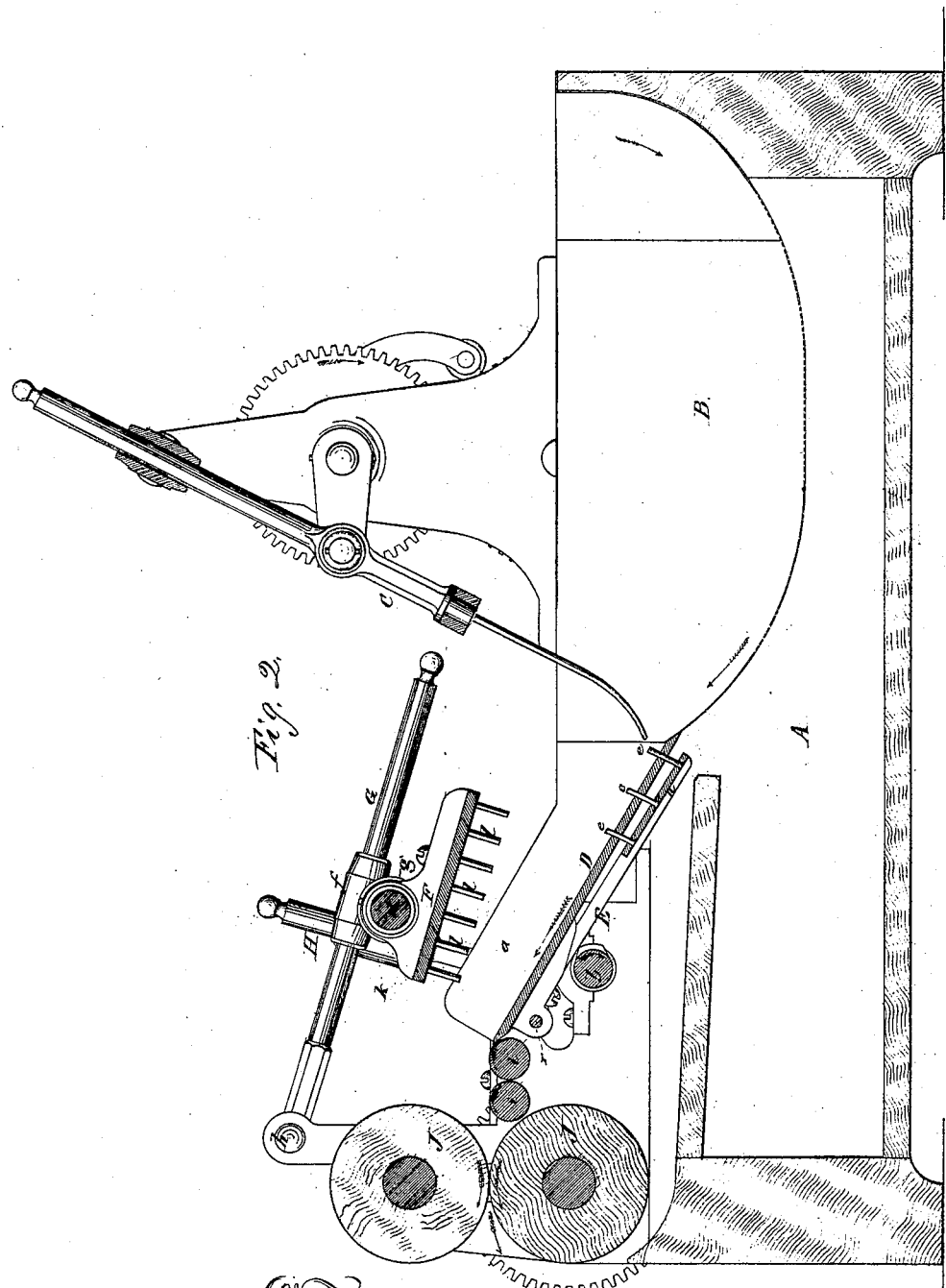

United States Patent Office.

CHARLES G. SARGENT, OF GRANITEVILLE, MASSACHUSETTS.

Letters Patent No. 103,506, dated May 24, 1870.

IMPROVEMENT IN MACHINERY FOR WASHING AND DYEING FIBROUS MATERIALS.

The Schedule referred to in these Letters Patent and making part of the same

To all whom it may concern:

Be it known that I, CHARLES G. SARGENT, of Graniteville, in the county of Middlesex, and State of Massachusetts, have invented certain Improvements in Machines for Washing and Dyeing Fibrous Materials, of which the following is a specification, reference being had to the accompanying drawings.

My invention relates to machines for washing and dyeing wool and other fibrous material; and The invention consists in certain novel features added to the machine heretofore patented to me, which features will be hereinafter more fully explained.

Figure 1 is a side elevation of my improved machine;

Figure 2 is a longitudinal vertical section of the same; and

Figure 3 is a top plan view thereof.

In constructing this machine, I provide a box or vat, A, for containing the solution or liquid, and place therein a perforated box, or, as it is technically termed, a bowl, B, to receive the wool, and use the stirrer or rake C, as heretofore. Instead, however, of conveying the wool from this rake C by a wheel, as heretofore, I have provided a new apparatus for that purpose, and it is in this, and the means for operating it, that my invention consists.

Between the end of the bowl and the squeezing-rolls J, I locate an inclined chute, D, which has raised sides a, as shown more clearly in fig. 2.

This incline or chute D has, near its lower end, several rows of holes through it, and through these holes pins e protrude, these pins being held in a bed-piece, n, secured to the end of a pair of arms, E, hinged underneath the chute D, at r, near its upper end.

A shaft, b, extends across the box, directly under these arms E; and this shaft is provided with cams c, which strike the arms as the shaft revolves, thereby raising the arms, and causing the pins e to protrude through the holes, with their points projecting above the bottom of the chute, as represented in fig. 2, their points falling down flush with or slightly below the surface of the chute, as soon as the cams c pass from under the arms.

I then provide a plate, F, which I denominate a carrier, and which has a series of pins projecting from its under face, as represented in fig. 2. This carrier I hang on a shaft, d, which extends transversely over the chute D, and which is connected by a sliding sleeve, f, to a rod, G, which has one end hinged at h to an upright, near the squeezing-rolls J, as represented in figs. 1 and 2.

This shaft b extends out at each side of the box, and is connected at each end by a sleeve, k, to an upright rod, H, which rods are pivoted by a sleeve, L, at their lower ends to the sides of the box, as shown in figs. 1 and 3.

These rods H are connected about midway of their length to a crank, T, secured upon either end of the transverse shaft b, also shown in figs. 1 and 3.

By this arrangement of the parts, it will be seen that, as the shaft b revolves, the cranks T will carry the rods H with them, causing the rods to slide up and down through the sleeve L at their lower ends, and also through the sleeve k above. United, the shoulders on the rods strike the sleeve k, and then lift the latter with them, and as the sleeves k are connected to the shaft d, they lift the latter also, and with it, the carrier F, thus raising the latter up off from the incline D, as represented in fig. 1. As, however, the lower ends of the rods H are held by the sleeves L, so as to prevent the cranks from carrying them around, they simply sliding up and down therein, it follows that the upper ends of said rods are made to move in a circle which is as large in diameter as the incline is long, or nearly so, the parts being proportioned to produce this result, and that, as they thus move, they carry the shaft d and carrier F with them, to and fro, up and down the incline D.

It is obvious that if the shaft d were attached rigidly to the rods H, it would travel in a circle, the same as the upper ends of the rods; but, as it is connected by the sleeves k, which slide to a certain extent on the rods H, it follows that, as the cranks rotate and pass from the upper to the lower point in their revolution, the shaft d, with the carrier, is brought down upon the incline at its lower end, and, as the cranks sweep around, they carry the upper ends of the rods H to the upper end of the incline, thereby carrying the carrier F along with them, the rods H having been depressed, so as to release their shoulders from the support of the carrier, which then rests on the raised sides a of the incline, and is, therefore, moved up the incline, parallel therewith in its movements.

By the time the carrier has reached the upper end of the incline, the cranks will have commenced to rise on the opposite side of their shaft b, and as they rise they raise the rods H, the shoulders of which, coming in contact with the under sides of the sleeves k, will elevate them, and the shaft d, with the carrier F, clear from the incline, and carry them over in the arc of a circle, back to the lower end of the incline again, ready for another upward movement.

The horizontal rod G rises and falls with the carrier, and as the slide f, which moves thereon, is secured rigidly to the shaft d, this rod G serves as a guide-rod to hold the carrier F from turning, and causes it to assume the required positions relative to the incline D.

It will be seen that, as the rod G rises as the carrier recedes, the latter will have its lower edge elevated, so as to pass over and come down upon the wool that may have been forced by the rake C upon the lower part of the incline D.

The shaft $d$ has a friction-roller, $g$, mounted on it, at each side of the carrier F, these rollers being located directly over the raised sides $a$ of the incline, so that when the carrier is brought down upon the incline, its weight is supported by these rollers on the sides or ledges $a$, up which they roll, as the carrier is moved forward.

These constitute my improvements, and, it will be seen, that when the machine thus constructed is set in motion, the wool or other material will be swept from the bowl B by the rake C upon the lower end of the incline or chute D, when the pins $e$ will be forced up from below, thus holding the material there, while the rake recedes, and until the carrier F comes down upon it from above, when the pins $e$ recede, and the carrier F forces the material up the incline, from whence it is conveyed by the rolls $i$ to the squeezing-rolls J, which press out the liquid.

The machine thus constructed operates in a very efficient and satisfactory manner.

Having thus described my invention,
What I claim is—

1. The chute D, in combination with the vibrating pins $e$, arranged to operate substantially as described.

2. The carrier F, in combination with the chute or incline D, when constructed and arranged to operate substantially as set forth.

3. The combination of the rods H, having their lower ends secured in position and operated by the cranks T, with the carrier F and rod G, all arranged to operate substantially as described.

4. The shaft $d$, having the carrier attached, and provided with the rollers $g$, to support the same, when moving up the incline, as set forth.

CHARLES G. SARGENT.

Witnesses:
ALLAN CAMERON,
J. HENRY KNOWLES.